United States Patent
Kim et al.

(10) Patent No.: US 8,989,962 B2
(45) Date of Patent: Mar. 24, 2015

(54) STRUCTURE FOR CONTROLLING ACTIVE MOUNT OF VEHICLE

(71) Applicant: Hyundai Motor Company, Seoul (KR)

(72) Inventors: Jang-Ho Kim, Whasung-Si (KR);
Yong-Jin Kim, Whasung-Si (KR);
Seung Won Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/106,755

(22) Filed: Dec. 14, 2013

(65) Prior Publication Data
US 2014/0365074 A1    Dec. 11, 2014

(30) Foreign Application Priority Data
Jun. 5, 2013 (KR) .................. 10-2013-0064704

(51) Int. Cl.
*G06F 7/00*  (2006.01)
*B60R 16/037*  (2006.01)
(52) U.S. Cl.
CPC ................................. *B60R 16/037* (2013.01)
USPC ........................................................ 701/36
(58) Field of Classification Search
CPC .................................. G06F 7/00; G06F 19/00
USPC ................................................ 701/36, 47, 111
See application file for complete search history.

(56) References Cited

U.S. PATENT DOCUMENTS

| | | | |
|---|---|---|---|
| 4,869,474 A | 9/1989 | Best et al. | |
| 5,398,917 A | 3/1995 | Carlson et al. | |
| 6,412,761 B1 | 7/2002 | Baudendistel et al. | |
| 2009/0256294 A1 | 10/2009 | Lee et al. | |
| 2011/0316206 A1* | 12/2011 | Kim et al. | 267/136 |
| 2012/0109457 A1* | 5/2012 | Okamoto et al. | 701/36 |

FOREIGN PATENT DOCUMENTS

JP    6-16050 A    1/1994

* cited by examiner

*Primary Examiner* — Kim T Nguyen
(74) *Attorney, Agent, or Firm* — Morgan Lewis & Bockius LLP

(57) ABSTRACT

A structure for controlling an integrated active mount of a vehicle improves driving performance of a vehicle, not reducing noise vibration, by providing a control signal with an inverse phase to the phase of the main excitation force of an engine in accordance with driving conditions through an active mount disposed between the engine and a vehicle body in order to reduce noise vibration of the vehicle.

7 Claims, 7 Drawing Sheets

STRUCTURE FOR CONTROLLING ACTIVE MOUNT OF VEHICLE

CROSS-REFERENCE TO RELATED APPLICATION

The present application claims priority of Korean Patent Application Number 10-2013-0064704 filed Jun. 5, 2013, the entire contents of which application is incorporated herein for all purposes by this reference.

BACKGROUND OF INVENTION

1. Field of Invention

The present invention relates to a structure for controlling an active mount of a vehicle, and more particularly, to a structure for controlling an integrated active mount of a vehicle which improves traveling performance of a vehicle, not for reducing noise vibration, by providing a control signal with an inverse phase to the phase of the main excitation force of an engine in accordance with traveling conditions through an active mount disposed between the engine and a vehicle body in order to reduce noise vibration of the vehicle.

2. Description of Related Art

In general, the engine of vehicles generates an excitation force due to vibration simultaneously with starting. The excitation force generated by the engine is transmitted to the vehicle body, and generated noise vibration, thereby reducing comfort of the driver. Accordingly, it has been required to develop a technology that minimizes excitation signals transmitted to a vehicle body.

As a technology for minimizing excitation signals transmitted to a vehicle body, an active mount designed to reduce excitation signals generated by an engine and transmitted to a vehicle body, using a mount connecting the engine and the vehicle body of a vehicle, has been known in the art.

Figure 1:
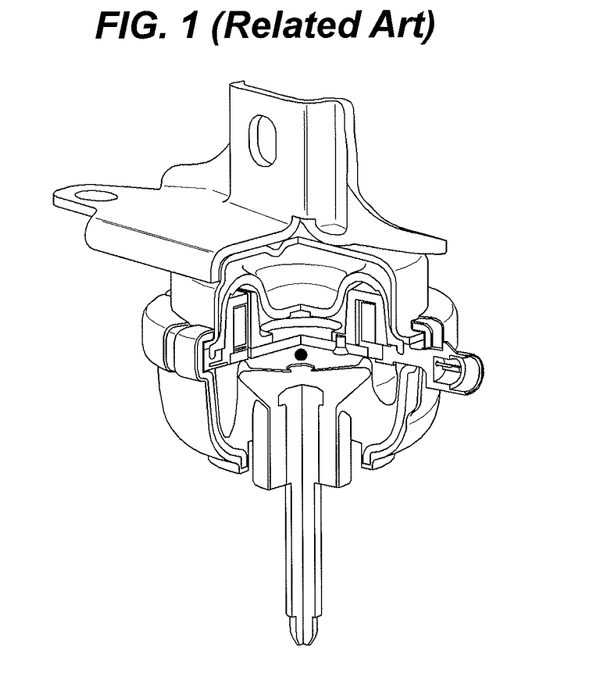
FIG. 1 shows an MR FLUID HYDRAULIC MOUNT, that is, a semi-active mount that control the behavior of a power train, using magneto-rheological fluid disclosed in U.S. Pat. No. 7,510,061 B2.

FIG. 1 shows an MR FLUID HYDRAULIC MOUNT, that is, a semi-active mount that control the behavior of a power train, using magneto-rheological fluid disclosed in U.S. Pat. No. 7,510,061 B2.

The magneto-rheological fluid is a suspension with soft magnetic particles mixed in liquid synthetic hydrocarbon, in which the magnetized particles shows fluid behavior like common fluid (fluid in a common hydro-mount) by non-uniformly dispersing in the OFF-state, but the particles are arranged in the structure of a fiber and the properties are changed in the ON-state, that is, a magnetic field is applied (shear stress=viscosity×shear rate+yield shear stress). The yield shear stress is proportioned to the applied magnetic field and the intensity of the magnetic field is proportioned to the intensity of the current flowing in a coil.

Accordingly, the semi-active mount using magneto-rheological fluid has a structure that improves noise vibration performance or traveling performance of a vehicle in accordance with the driving conditions by injecting magneto-rheological fluid with the properties into a mount and applying a magnetic field to the magneto-rheological fluid so that the shear stress of the fluid changes and the dynamic stiffness and damping characteristic change in real time.

Accordingly, according to the configuration, vibration noise and traveling performance are effectively improved by controlling the dynamic stiffness and damping characteristic of a mount by changing the current applied to the coil in accordance with the driving conditions, in order to reduce vibration by blocking a current input signal so that the stiffness of the mount decreases in normal traveling, and to improve the traveling performance by inputting a current so that the stiffness of the mount in sporty traveling.

However, the semi-active mount using magneto-rheological fluid has a defect that although it is possible to increase the characteristics more than the characteristics, which are set in designing, it is impossible to reduce the characteristics and to select vibration components (frequency) to reduce, when operating the actuator.

On the other hand, as another active mount, an active mount using an electric actuator has been used in the art.

Figure 2:
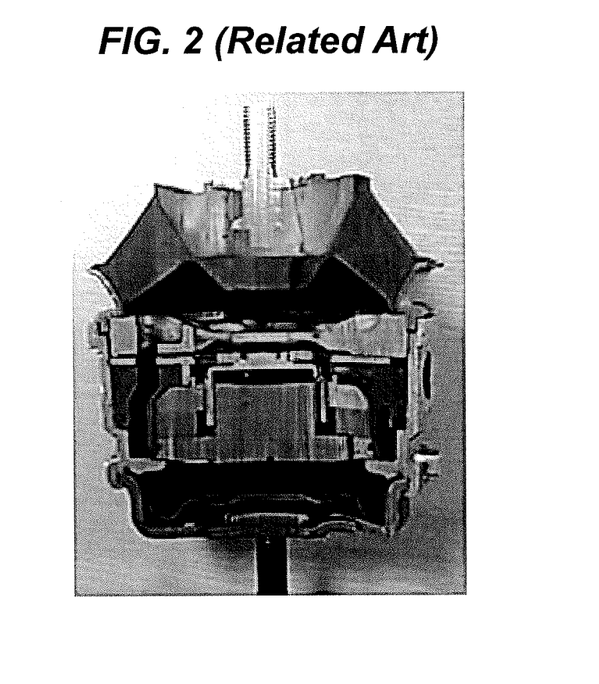
FIG. 2 shows one of active mounts using an electric actuator in the art.

FIG. 2 shows one of active mounts using an electric actuator in the art.

The active mount using an electric actuator has a bidirectional control structure that operates the actuator, using Lorenz force between a permanent magnet and a coil to which a current is applied, and moves a decoupler up/down using the actuator, thereby reducing the dynamic characteristics of the mount in a desired section and reducing vibration transmission rate of a power train.

Accordingly, the active mount having the structure reduces the dynamic characteristics of the mount by vibrating the decoupler with the same phase as that of vibration inputted to the mount, by measuring or estimating vibration inputted to the active mount and changing the control signal applied to the coil. In this configuration, it is possible to set Lorenz force in different directions by applying the current in the forward direction or the backward direction, and thus the direction of the control force can be changed.

However, the active mount using an electric actuator still has a defect that it is possible to decrease the characteristics more than the characteristics, which are set in designing, but it is impossible to increase them, when operating the actuator.

Figure 3:
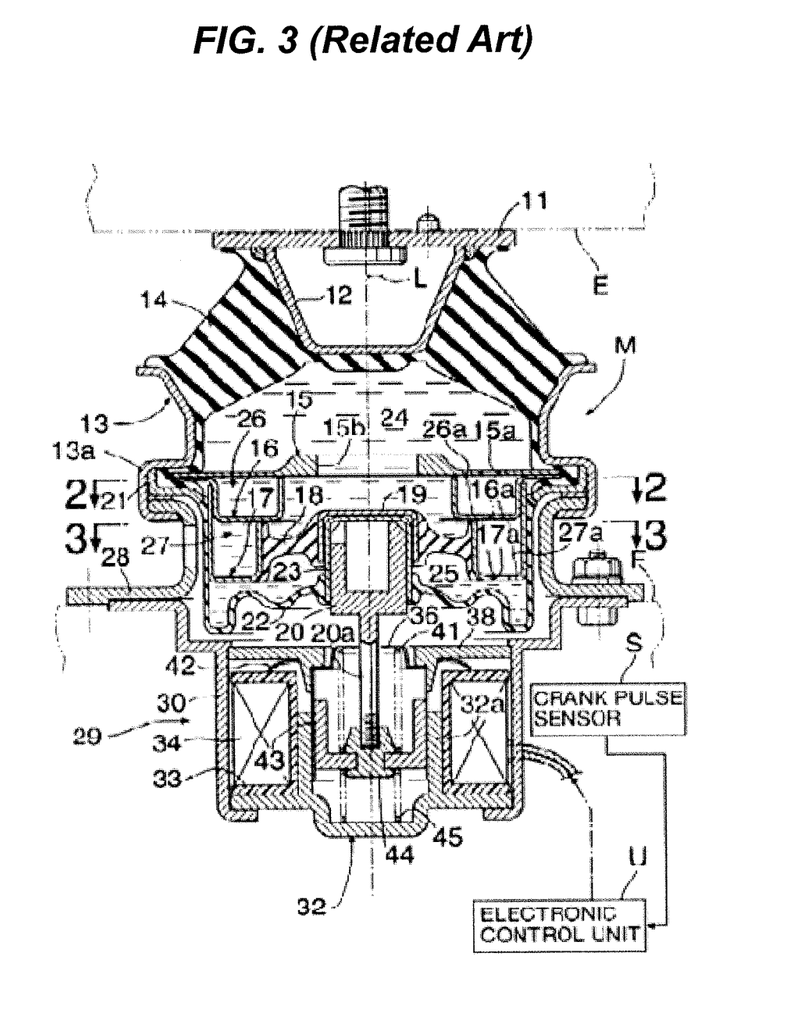
FIG. 3 shows an electromagnetic integrated active mount using an electromagnetic actuator disclosed in U.S. Pat. No. 6,641,120 B2.

FIG. 3 shows an electromagnetic integrated active mount using an electromagnetic actuator disclosed in U.S. Pat. No. 6,641,120 B2.

The electromagnetic integrated active mount using an electromagnetic actuator has a structure, which includes a rubber actuating plate under an injection chamber and improves an insulation rate against vibration transmitted to a vehicle body through a mount by moving the actuating plate up/down, using the control force (attractive force) of the electromagnetic actuator and the elastic force (restoring force) of the rubber, and changes the volume of the injection chamber and insulates vibration through a reduction in mount characteristic by changing the control signals applied to the electromagnetic actuator in accordance with driving conditions so that the actuating plate moves up/down with the same phase as that of the vibration inputted to the mount.

The dynamic characteristics of the mount is reduced by a controller that estimates vibration inputted to the mount from the vehicle information and vibrates the decoupler by applying a corresponding current with the same phase to the coil.

However, the electromagnetic integrated active mount can attract conductors around, using input signals, but the conductors around are returned by the restoring force of the actuating plate made of rubber. Accordingly, only unidirectional control is possible.

Further, the integrated active mount using an electromagnetic actuator, similar to the active mount using an electric actuator, has a defect that that it is possible to decrease the characteristics more than the characteristics, which are set in designing, but it is impossible to increase them, when operating the actuator.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a structure for controlling an integrated active mount of a vehicle which improves driving performance of a vehicle, not reducing noise vibration, by providing a control signal with an inverse phase to the phase of the main excitation force of an engine in accordance with driving conditions through an active mount disposed between the engine and the chassis in order to reduce noise vibration of the vehicle.

A structure for controlling an integrated active mount of a vehicle, which includes an integrated active mount disposed between the engine and the vehicle body of a vehicle and a controller controlling the active engine mount, includes: a step in which the controller receives a signal relating to traveling of the vehicle; a step in which the controller determines whether the vehicle requires to improve traveling performance now on the basis of information on the received signal relating to the traveling of the vehicle; a step in which the controller calculates a control current generating a control signal having an inverse phase to that of vibration applied to the integrated active mount, when determining that the traveling performance requires to be improved; a step in which the controller calculates a control current generating a control signal having the same phase as that of vibration applied to the integrated active mount, when determining that the traveling performance does not require to be improved; and a step in which the controller applies the calculated control current to the integrated active mount.

The controller may further include determining whether the vehicle requires to improve the traveling performance now, by determining whether the values of one or more items of information in the steering angle, transverse acceleration, and speed of the vehicle are increased to a predetermined level or more, on the basis of the signal relating to traveling of the vehicle.

The controller may further include: determining whether the vehicle now requires to reduce vibration in the driving system by determining any one of whether the values of one or more items of information in the vehicle speed, the RPM of the engine of the vehicle, and whether the automatic transmission is locked up are increased to predetermined values or more and included in a predetermined range, on the basis of the signal relating to traveling of the vehicle and calculating a control current generating a control signal having a predetermined phase difference from that of vibration applied to the integrated active mount, when determining the traveling performance requires to be improved.

The controller may further include determining whether the vehicle requires to improve the traveling performance now, by determining any one of whether the values of one or more items of information in the acceleration pedal and the degree of opening of a throttle valve of the vehicle are increased to a predetermined level or more, on the basis of the signal relating to traveling of the vehicle.

The step in which the controller calculates a control current generating a control signal having a predetermined phase difference from that vibration applied to the integrated active mount, when determining that the traveling performance requires to be improved, may further include calculating a control current generating a control signal having a phase difference of 90 degrees from that of vibration applied to the integrated active mount.

The structure may further include: a step in which the controller receives a signal relating to vibration of the vehicle; a step in which the controller estimates and calculates vibration inputted to the integrated active mount in response to the signal relating to vibration of the vehicle; a step in which the controller receives vibration inputted to the integrated active mount from a sensor for measuring vibration on the vehicle body; a step in which the controller calculates the characteristics (frequency, phase, intensity etc.) of vibration inputted to the integrated active mount; a step in which the controller calculates a control current generating a control signal having the same phase as that of vibration applied to the integrated active mount on the basis of the calculated vibration characteristic; and a step in which the controller calculates a control current generating a control signal having an inverse phase to that of vibration applied to the integrated active mount on the basis of the calculated vibration characteristic.

According to various aspects of the present invention, it is possible to increase stiffness of a mount and improve traveling performance through control of the behavior of an engine, by generating a control signal having an inverse phase to that of vibration applied to the mount, using a control current applied to the integrated active mount disposed between the engine and the vehicle body of a vehicle.

Further, since there is provided a configuration that controls a current applied to the coil of the active mount to reduce vibration, various aspects of the present invention may be used for not only an integrated active mount with an electric actuator, but also an integrated active mount with an electromagnetic actuator, without a specific additional configuration.

Since it is possible to improve traveling performance and use the existing configuration, other than the original function that improves vibration noise performance in accordance with driving conditions by changing the method of controlling an active engine mount disposed between the engine and the vehicle body of a vehicle, an additional cost is not generated.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 4:
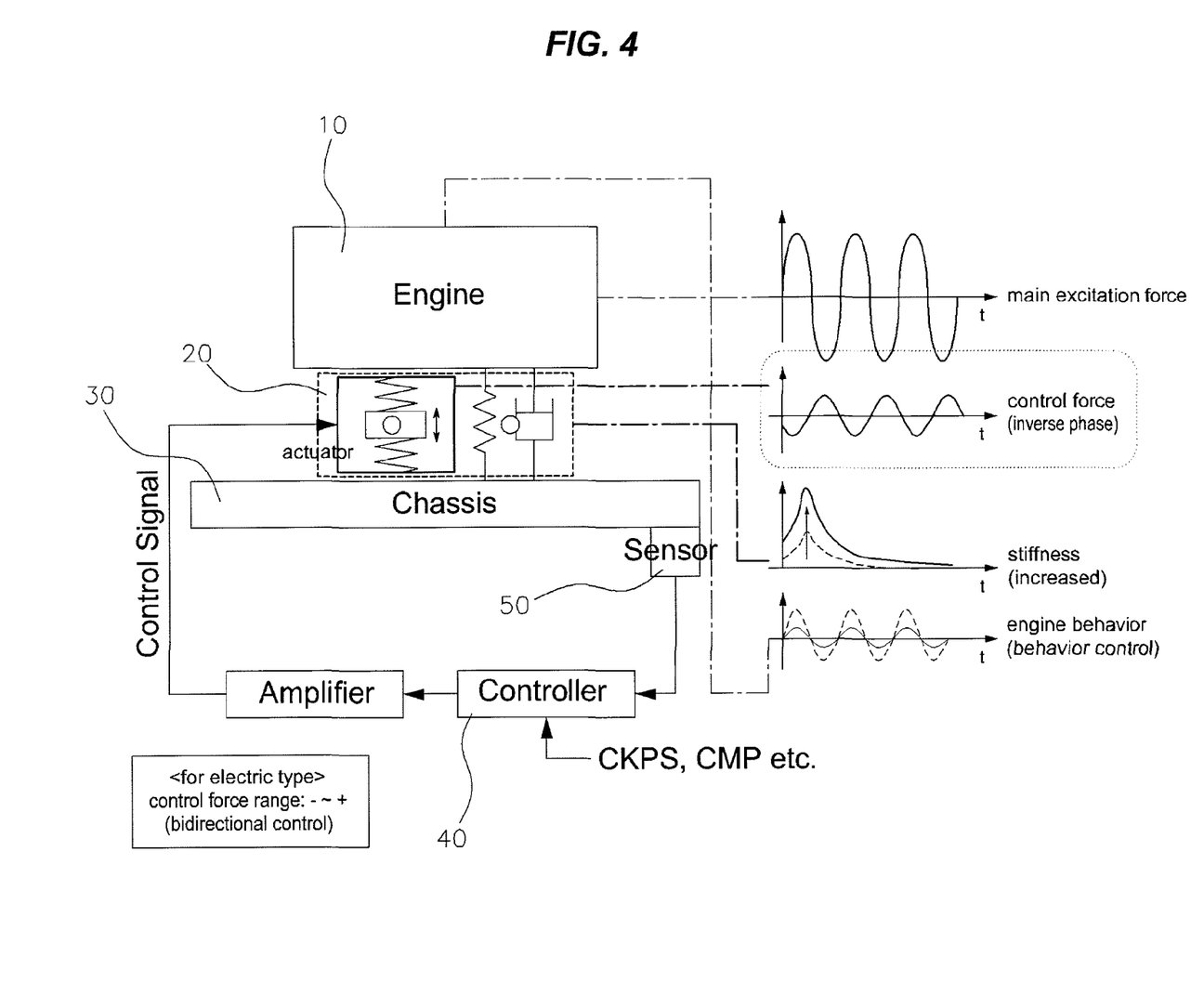
FIG. 4 is a block diagram showing an exemplary structure for controlling an integrated active mount of a vehicle of the present invention.

FIG. 4 is a block diagram showing an exemplary structure for controlling an integrated active mount of a vehicle according to various embodiments of the present invention.

As shown in the figure, in a structure for controlling an integrated active mount of a vehicle according to various embodiments of the present invention, an integrated active mount 20 including an electric actuator between an engine 10 and a vehicle body 30 (chassis) is provided.

The integrated active mount 20 is controlled by a controller 40, in which the controller 40 controls the integrated active mount 20 on the basis of information inputted through a sensor 50 on the vehicle body 30.

Accordingly, when an excitation force is generated by the engine 10 due to vibration and traveling of a vehicle, the controller 40 improves traveling performance or reduces noise vibration by increasing or decreasing stiffness of the mount, by controlling the integrated active mount 20 to generate a control signal.

In various embodiments for improving traveling performance by controlling the behavior of a power train of the present invention, the control signal that is applied to the integrated active mount 20 may have an inverse phase to that of the main excitation force generated by the engine 10.

Accordingly, as a control signal having the same frequency as that of the main excitation force generated by the engine 10 and the inverse phase is applied to the integrated active mount, the stiffness of the engine mount increases and the behavior of the engine 10 decreases, and accordingly, the traveling performance is improved.

Figure 5:
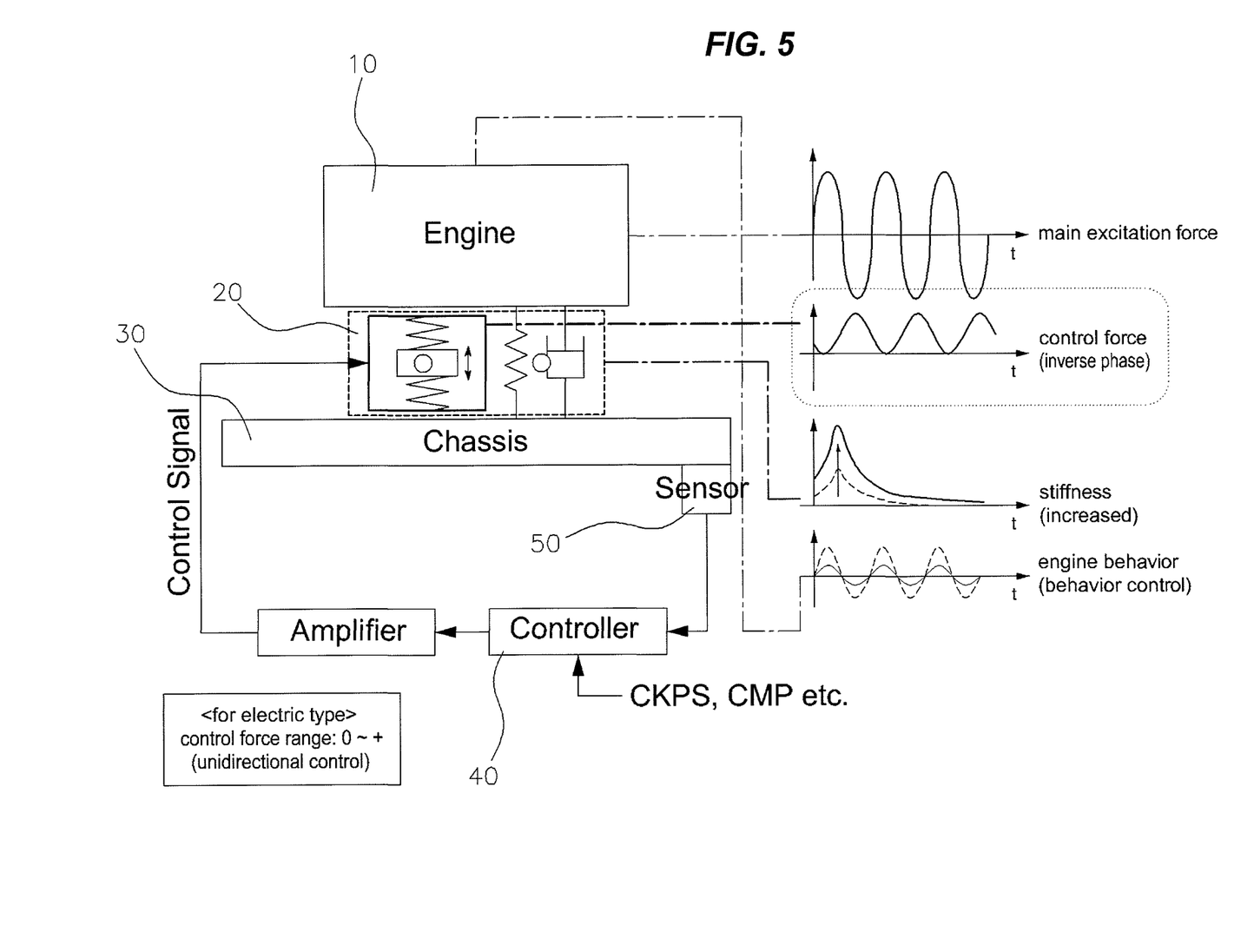
FIG. 5 is a block diagram showing an exemplary structure for controlling an integrated active mount of a vehicle of the present invention.

FIG. 5 is a block diagram showing an exemplary structure for controlling an integrated active mount of a vehicle according to various embodiments of the present invention.

As shown in the figure, in a structure for controlling an integrated active mount of a vehicle according to various embodiments of the present invention, an integrated active mount 20 including an electromagnetic actuator between an engine 10 and a vehicle body 30 (chassis) is provided.

Further, the integrated active mount 20 is, similar to that described above, controlled by a controller 40, in which the controller 40 controls the integrated active mount 20 on the basis of information inputted through a sensor 50 on the vehicle body 30.

Accordingly, when an excitation force is generated by the engine 10 due to vibration and traveling of a vehicle, the controller 40 improves traveling performance or reduces noise vibration by increasing or decreasing rigidity of the mount, by controlling the integrated active mount 20 to generate a control signal.

In various embodiments of the present invention, the control signal that is applied to the integrated active mount 20, similar to that described above, may have an inverse phase to that of the main excitation force generated by the engine 10. However, since the electromagnetic actuator can perform only unidirectional control, the stiffness may not be increased against inverse directional vibration in which control is impossible.

However, as the electromagnetic actuator also applies a control signal having an inverse phase to the phase of the main excitation force generated by the engine 10, the stiffness of the engine mount increases and the behavior of the engine 10 decreases, and accordingly, the traveling performance is improved.

Figure 6:
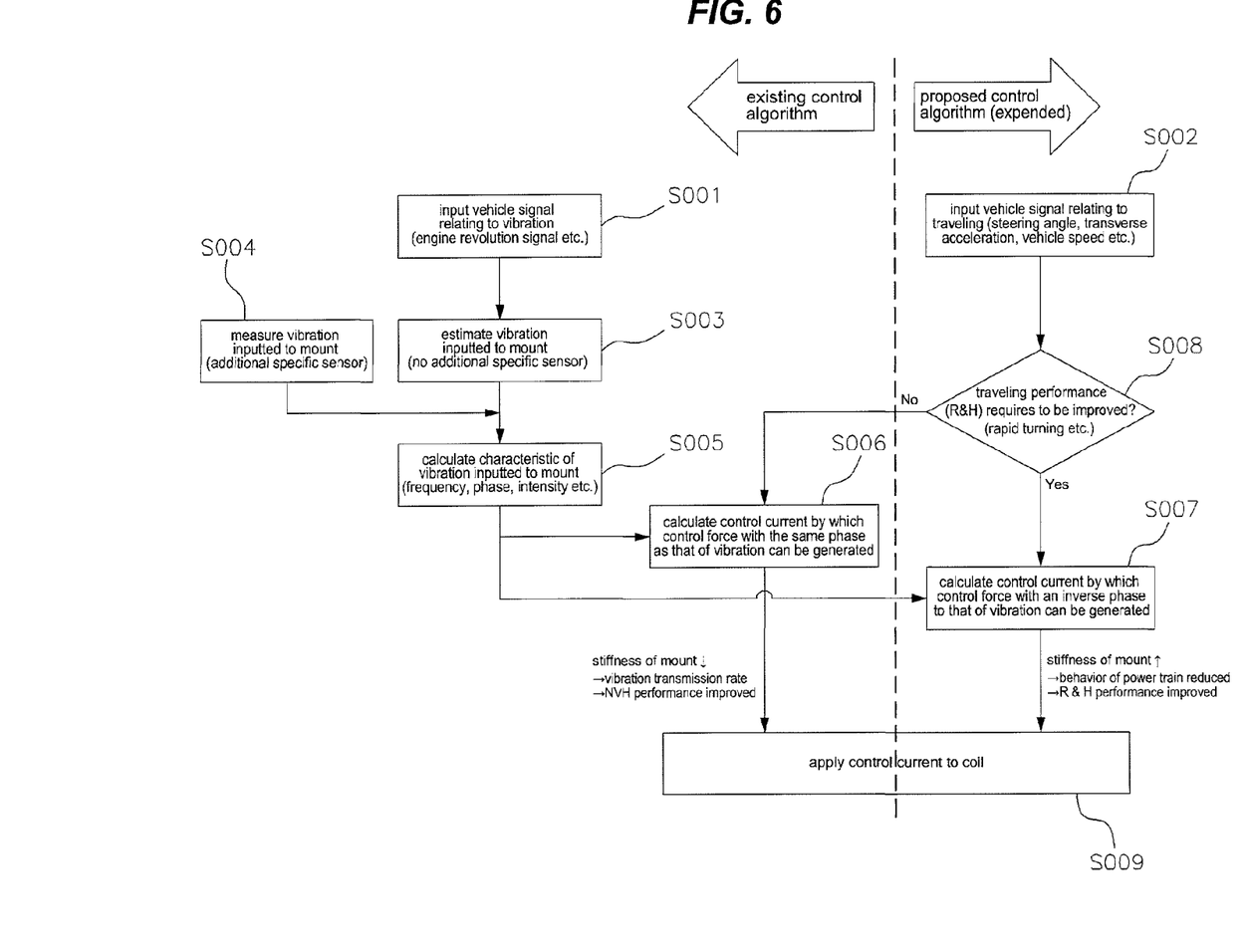
FIG. 6 is a flowchart illustrating an exemplary method of controlling an integrated active mount, using a controller of a structure for controlling an integrated active mount of a vehicle according to the present invention.

FIG. 6 is a flowchart illustrating a method of controlling the integrated active mount, using a controller of the structure for controlling an integrated active mount of a vehicle according to various embodiments of the present invention.

The controller 40 receives signals relating to vibration of a vehicle (revolution signal of the engine 10) and signals relating to traveling of the vehicle (steering angle, transverse acceleration, and vehicle speed etc.) from a driving unit of the vehicle and the controller 40 (S001 and S002). The signals may be inputted from various sensors in the vehicle, which are well known in the art, (any sensors in the vehicle which are well known in the art) or may receive from an electromagnetic control unit 40 of an electromagnetic power steering of the vehicle using the signals.

The controller 40 estimates and calculates vibration inputted to the integrated active mount 20 in response to the signals relating to vibration of the vehicle (S003). In this case, the signals relating to vibration of the vehicle are received from components disposed in advance in the vehicle, so there is no need of a specific additional sensor for estimating the vibration. For the method of estimating and calculating vibration, vibration may be estimated from values that are measured and set in advance or specific formulas may be used, and it is not limited in the present invention.

On the other hand, the controller 40 receives vibration inputted to the integrated active mount 20 from a sensor 50 specifically disposed on the vehicle body 30 to measure vibration (S004).

The controller 40 calculates properties (frequency, phase, and intensity) of the vibration inputted to the integrated active mount 20 from the signals received in the steps S003 and S004.

Thereafter, the controller 40 calculates a control current generating a control signal with the same phase as that of the vibration applied to the integrated active mount 20, on the basis of the vibration properties calculated in the step S005 (S006).

Further, the controller 40 calculates a control current generating a control signal with an inverse phase to that of the vibration applied to the integrated active mount 20, on the basis of the vibration properties calculated in the step S005 (S007).

The controller 40 determines whether the vehicle requires to improve traveling performance now on the basis of the information on the signals relating to traveling of the vehicle inputted in the step S002 (S008). In this step, when the current steering angle, transverse acceleration, and speed of the vehicle increase to predetermined levels or more, the traveling performance may be more important than the performance of reducing noise vibration, so the traveling performance is required to increase for improving the commercial value of the vehicle, and thus, this is determined.

When it is determined that the steering angle, transverse acceleration, and speed of the vehicle increase to predetermined levels or more in the step S008, the controller 40 calculates a control signal generating a control signal with an inverse phase to that of the vibration applied to the integrated active mount 20 by performing the step S007. Accordingly, when the calculated control current is applied to the coil, it is possible to improve traveling performance by reducing the behavior of the power train by increasing the stiffness of the mount.

When it is determined that the steering angle, transverse acceleration, and speed of the vehicle decrease to predetermined levels or less in the step S008, the controller 40 calculates a control signal generating a control signal with the same phase as that of the vibration applied to the integrated active mount 20 by performing the step S006. Accordingly, when the calculated control current is applied to the coil, it is possible to reduce vibration transmission rate and improve noise vibration performance by reducing the stiffness of the mount.

Therefore, the control current calculated by the controller 40 through the steps S006 and S007 is finally applied to the coil (S009).

Figure 7:
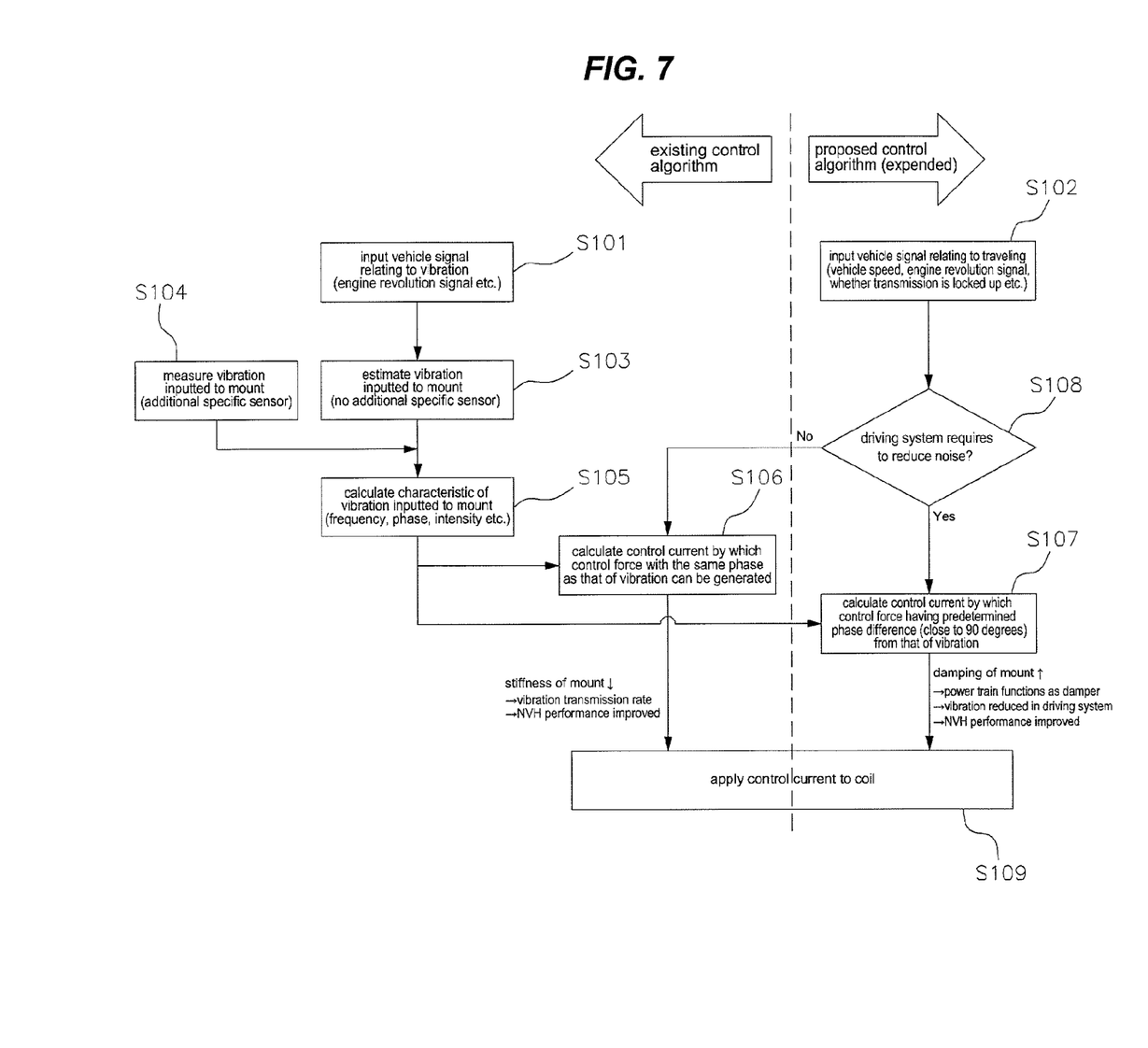
FIG. 7 is a flowchart illustrating an exemplary method of controlling an integrated active mount, using a controller of a structure for controlling an integrated active mount of a vehicle according to the present invention.

FIG. 7 is a flowchart illustrating a method of controlling the integrated active mount, using a controller of the structure for controlling an integrated active mount of a vehicle according to various embodiments of the present invention.

In various embodiments of the present invention, a torque converter may be locked up in accordance with the driving conditions to improve fuel efficiency in an automatic transmission well known in the art, and there was a defect in a rear-wheel drive vehicle that the excitation force of the engine is introduced into the interior through the driving system (propeller shaft-rear DIF-rear DIF mounting) and decreases vibration noise performance.

Accordingly, in various embodiments of the present invention, in order to reduce vibration transmitted to the driving system, the controller 40 measures vibration inputted to the active mount by itself, using the sensor 50 so that the power train functions as a damper, or estimates and calculates it from vehicle information (RPM), and a control current is calculated such that the phase difference between vibration and a control is close to 90 degrees to effectively generate a damping force against the vibration and is then applied to the coil.

The controller 40 receives signals relating to vibration of a vehicle (revolution signal of the engine 10) and signals relating to traveling of the vehicle (vehicle speed, engine revolution signal, whether the transmission is locked up) from a driving unit of the vehicle and the controller 40 (S101 and S102). The signals may be inputted from various sensors in the vehicle, which are well known in the art, (any sensors in the vehicle which are well known in the art) or may receive from an electromagnetic control unit 40 of an electromagnetic power steering of the vehicle using the signals.

The controller 40 estimates and calculates vibration inputted to the integrated active mount 20 in response to the signals relating to vibration of the vehicle (S103). In this case, the signals relating to vibration of the vehicle are received from components disposed in advance in the vehicle, so there is no need of a specific additional sensor for estimating the vibration. For the method of estimating and calculating vibration, vibration may be estimated from values that are measured and set in advance or specific formulas may be used, and it is not limited in the present invention.

On the other hand, the controller 40 receives vibration inputted to the integrated active mount 20 from a sensor 50 specifically disposed on the vehicle body 30 to measure vibration (S104).

The controller 40 calculates properties (frequency, phase, and intensity) of the vibration inputted to the integrated active mount 20 from the signals received in the steps S103 and S104.

Thereafter, the controller 40 calculates a control current generating a control signal with the same phase as that of the vibration applied to the integrated active mount 20, on the basis of the vibration properties calculated in the step S105 (S106).

Further, the controller 40 calculates a control current generating a control signal with an inverse phase to that of the vibration applied to the integrated active mount 20, on the basis of the vibration properties calculated in the step S105 (S107).

The controller 40 determines whether the vehicle now requires to reduce vibration in the driving system on the basis of information on the signals relating to traveling of the vehicle inputted in the step S102 (S108). In this step, vibration by lock-up of the transmission is largely transmitted due to high RPM of the engine while the excitation force of the engine 10 of the vehicle is currently introduced into the indoor, so that vibration noise performance may be deteriorated, and it is required to improve noise vibration performance of the entire vehicle in order to improve the commercial value of the vehicle, and thus it is determined.

When it is determined that the vibration of the driving system requires to be reduced due to large vibration by lock-up of the transmission due to high RPM of the engine 10 in the step S108, the controller 40 calculates a control current generating a control signal having a predetermined phase difference (close to 90 degrees) from that of the vibration applied to the integrated active mount 20 by performing the step S107. Accordingly, when the calculated control current is applied to the coil, damping for the mount is increased, the power train performs damping, and vibration is reduced, an accordingly, the noise vibration performance can be improved.

When it is determined that the vibration of the driving system does not require to be reduced due to small vibration by lock-up of the transmission due to low RPM of the engine 10 in the step S108, the controller 40 calculates a control current generating a control signal having the same phase as that of the vibration applied to the integrated active mount 20 by performing the step S106. Accordingly, when the calculated control current is applied to the coil, it is possible to reduce vibration transmission rate and improve noise vibration performance of the entire vehicle by reducing the stiffness of the mount.

Therefore, the control current calculated by the controller 40 through the steps S106 and S107 is finally applied to the coil (S109).

Figure 8:
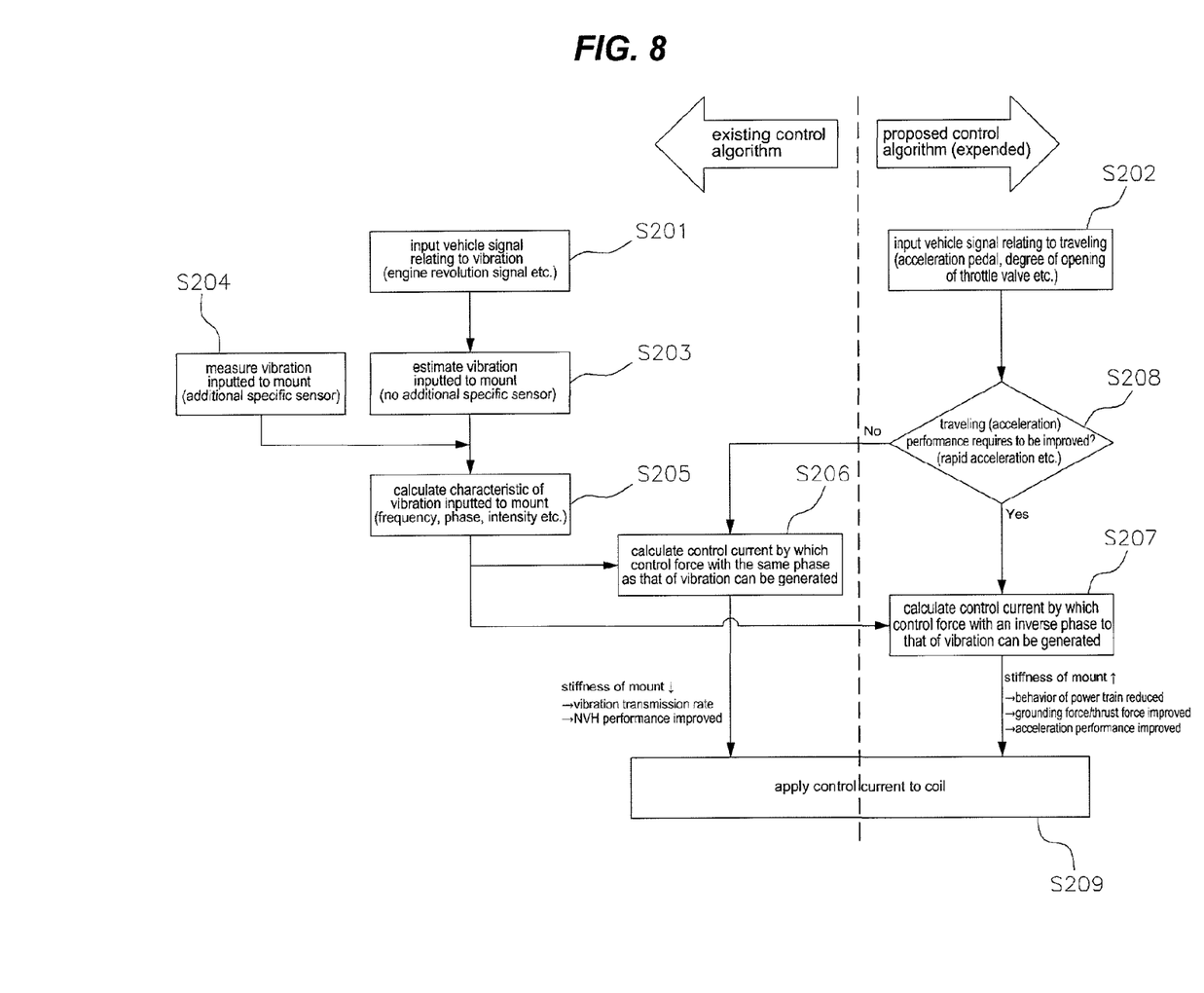
FIG. 8 is a flowchart illustrating an exemplary method of controlling an integrated active mount, using a controller of a structure for controlling an integrated active mount of a vehicle according to the present invention.

FIG. 8 is a flowchart illustrating a method of controlling the integrated active mount, using a controller of the structure for controlling an integrated active mount of a vehicle according to various embodiments of the present invention.

In general, when a vehicle is rapidly accelerated, the power train rotates and the grounding force of the driving wheels to the surface of a road decreases, so a loss of the force that thrusts the vehicle is generated and the acceleration performance may be reduced.

In various embodiments of the present invention, in order to prevent the decrease in acceleration performance, sufficient grounding signals of the driving wheels to the surface of a road are ensured by minimizing the rotational displacement of the power train in rapid accelerating and the behavior of the power train is controlled under specific traveling conditions (rapid acceleration) to be able to improve the decrease in acceleration performance due to the loss of thrust force; therefore the stiffness of the mount can be increased to improve traveling performance, particularly the acceleration performance of the vehicle.

First, the controller 40 receives signals relating to vibration of a vehicle (revolution signal of the engine 10) and signals relating to traveling of the vehicle (acceleration pedal and the degree of opening of a throttle valve) from a driving unit of the vehicle and the controller 40 (S201 and S202). The signals may be inputted from various sensors in the vehicle, which are well known in the art, (any sensors in the vehicle which are well known in the art) or may receive from an electromagnetic control unit 40 of an electromagnetic power steering of the vehicle using the signals.

The controller 40 estimates and calculates vibration inputted to the integrated active mount 20 in response to the signals relating to vibration of the vehicle (S203). In this case, the signals relating to vibration of the vehicle are received from components disposed in advance in the vehicle, so there is no need of a specific additional sensor for estimating the vibration. For the method of estimating and calculating vibration, vibration may be estimated from values that are measured and set in advance or specific formulas may be used, and it is not limited in the present invention.

On the other hand, the controller 40 receives vibration inputted to the integrated active mount 20 from a sensor 50 specifically disposed on the vehicle body 30 to measure vibration (S204).

The controller 40 calculates properties (frequency, phase, and intensity) of the vibration inputted to the integrated active mount 20 from the signals received in the steps S203 and S204.

Thereafter, the controller 40 calculates a control current generating a control signal with the same phase as that of the vibration applied to the integrated active mount 20, on the basis of the vibration properties calculated in the step S205 (S206).

Further, the controller 40 calculates a control current generating a control signal with an inverse phase to that of the vibration applied to the integrated active mount 20, on the basis of the vibration properties calculated in the step S205 (S207).

The controller 40 determines whether the vehicle requires to improve traveling (acceleration) performance (to be rapidly accelerate) now on the basis of information on the signals relating to traveling of the vehicle inputted in the step S202 (S208). This step is provided to operate the power train for ensuring a sufficient grounding force of the driving wheels on the surface of a road in order to prevent a loss of thrust force of the vehicle in rapid acceleration.

When it is determined that the change speed of the acceleration pedal increases to a predetermined value or more in the step S208, the controller 40 determines that the vehicle has been rapidly accelerated and calculates a control current generating a control signal having an inverse phase to that of the vibration applied to the integrated active mount 20 by performing the step S207 in order to improve the traveling performance. Accordingly, when the calculated control current is applied to the coil, the stiffness of the mount is increased and the behavior of the power train is reduced, and accordingly, the grounding force of the driving wheels on the surface of a road and the thrust force are improved, and thus the acceleration performance can be improved.

When it is determined that the change speed of the acceleration pedal decrease to a predetermined value or less in the step S208, the controller 40 calculates a control signal generating a control signal with the same phase as that of the vibration applied to the integrated active mount 20 by performing the step S206. Accordingly, when the calculated control current is applied to the coil, it is possible to reduce vibration transmission rate and improve noise vibration performance by reducing the stiffness of the mount.

Therefore, the control current calculated by the controller 40 through the steps S206 and S207 is finally applied to the coil (S209).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for controlling an integrated active engine mount of a vehicle, comprising:
   an integrated active engine mount disposed between an engine and a vehicle body;
   a controller controlling the integrated active engine mount, wherein the controller is configured to perform:
   a step in which the controller receives a signal relating to traveling of the vehicle;
   a step in which the controller determines whether the vehicle requires improvement in traveling performance now based on information on the received signal relating to the traveling of the vehicle;
   a step in which the controller calculates a control current generating a control signal having an inverse phase to that of vibration applied to the integrated active mount, when determining that the traveling performance requires improvement;

a step in which the controller calculates the control current generating the control signal having the same phase as that of the vibration applied to the integrated active mount, when determining that the traveling performance does not require improvement; and a step in which the controller applies the calculated control current to the integrated active mount.

2. The structure of claim 1, wherein the step in which the controller determines whether the vehicle requires improvement in traveling performance now on the basis of the information on the received signal relating to the traveling of the vehicle, wherein the controller is further configured for:

determining whether the vehicle requires improvement in the traveling performance now, by determining whether values of one or more items of information in a steering angle, transverse acceleration, and speed of the vehicle are increased at least to a predetermined level on the basis of the received signal relating to the traveling of the vehicle.

3. The structure of claim 1, wherein the step in which the controller determines whether the vehicle requires improvement in traveling performance now on the basis of the information on the received signal relating to the traveling of the vehicle, wherein the controller is further configured for:

determining whether the vehicle requires improvement in the traveling performance now, by determining whether values of one or more items of information in an acceleration pedal and the degree of opening of a throttle valve of the vehicle are increased at least to a predetermined level, on the basis of the received signal relating to the traveling of the vehicle.

4. The structure of claim 1, wherein the controller is further configured for:

a step in which the controller determines whether the vehicle now requires noise reduction in a driving system on the basis of the information on the received signal relating to the traveling of the vehicle; and a step in which the controller calculates the control current generating the control signal having a predetermined phase difference from the vibration applied to the integrated active mount, when determining that the traveling performance requires improvement.

5. The structure of claim 4, wherein the controller is further configured for:

a step to determine whether the vehicle now requires to reducing the vibration in a driving system by determining any one of whether RPM of the engine of the vehicle is increased at least to a predetermined value, on the basis of the received signal relating to the traveling of the vehicle.

6. The structure of claim 4, wherein the step in which the controller calculates the control current generating the control signal having a predetermined phase difference from the vibration applied to the integrated active engine mount, when determining that the traveling performance requires improvement, wherein the controller is further configured for:

calculating the control current generating the control signal having the phase difference, wherein the phase difference is 90 degrees from that of the vibration applied to the integrated active mount.

7. The structure of claim 1, wherein the controller is further configured for:

a step in which the controller receives a signal relating to vibration of the vehicle;

a step in which the controller estimates and calculates vibration input to the integrated active mount in response to the signal relating to vibration of the vehicle;

a step in which the controller receives vibration input to the integrated active mount from a sensor for measuring vibration on the vehicle body;

a step in which the controller calculates a characteristic of the vibration input to the integrated active mount;

a step in which the controller calculates the control current generating the control signal having a same phase as that of the vibration applied to the integrated active engine mount on the basis of the calculated vibration characteristic; and a step in which the controller calculates the control current generating the control signal having an inverse phase to that of the vibration applied to the integrated active mount on the basis of the calculated vibration characteristic.

\* \* \* \* \*